Sept. 25, 1962  E. C. ROWE ET AL  3,055,557
LIQUID DISPENSER
Filed Aug. 21, 1959  3 Sheets-Sheet 1
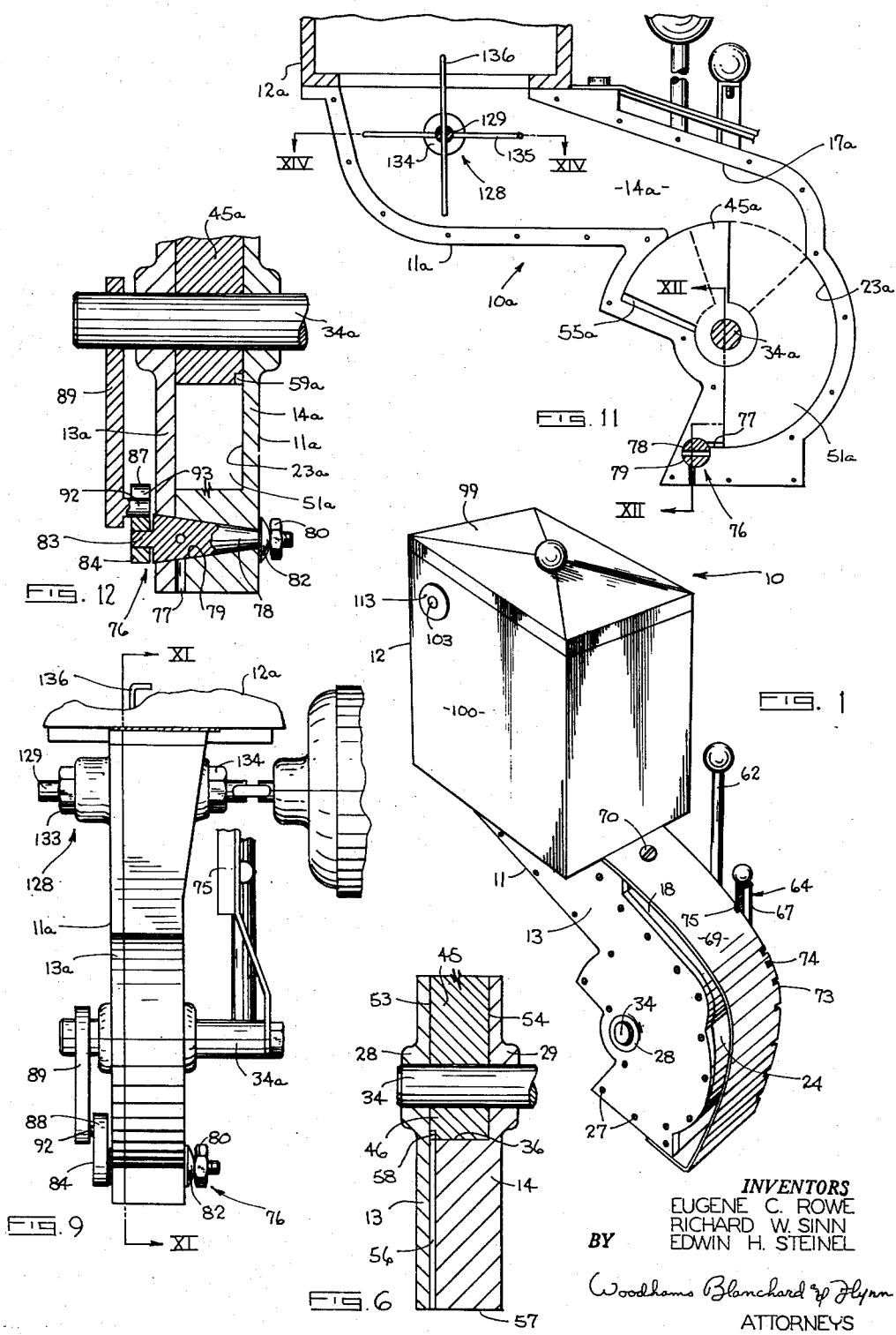
INVENTORS
EUGENE C. ROWE
RICHARD W. SINN
EDWIN H. STEINEL
BY Woodhams Blanchard & Flynn
ATTORNEYS

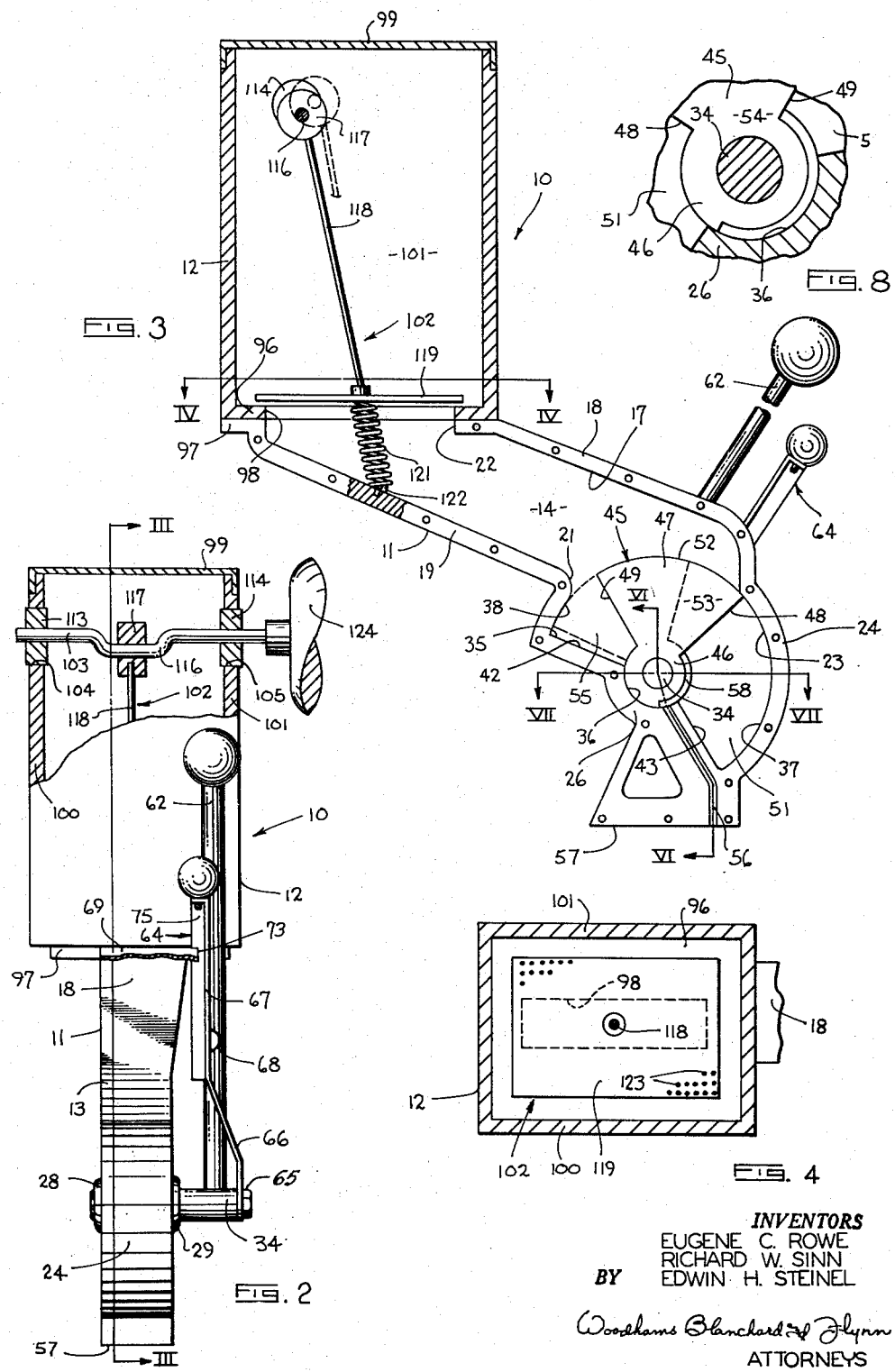

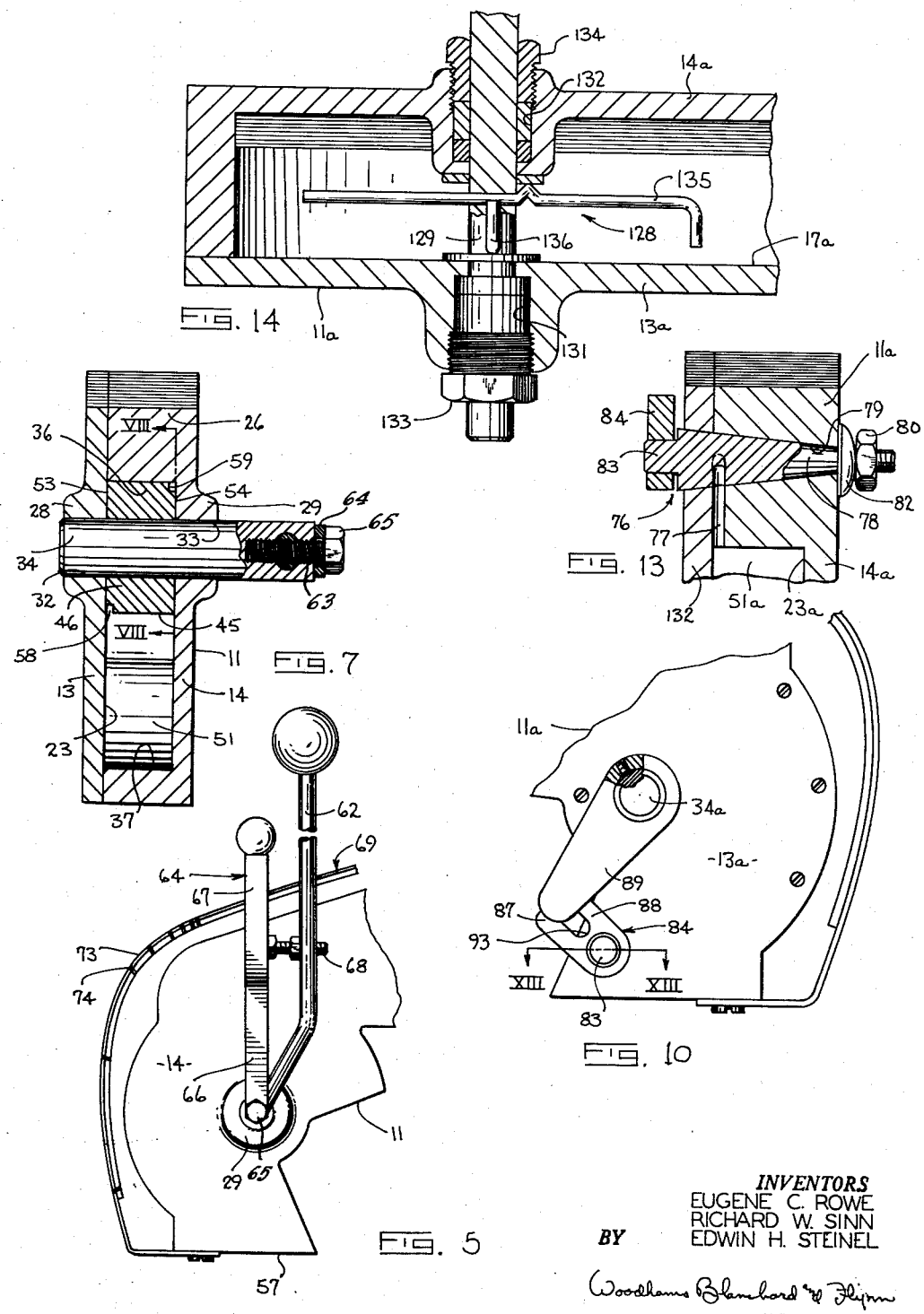

United States Patent Office 3,055,557
Patented Sept. 25, 1962

3,055,557
LIQUID DISPENSER
Eugene C. Rowe and Richard W. Sinn, Ann Arbor, and Edwin H. Steinel, Huntington Woods, Mich., assignors to Color Corporation of America, Rockford, Ill., a corporation of Illinois
Filed Aug. 21, 1959, Ser. No. 835,319
9 Claims. (Cl. 222—227)

This invention relates in general to an apparatus for dispensing liquids and, more particularly, to a type thereof wherein the liquids can be constantly and thoroughly agitated and can be accurately dispensed in predetermined amounts, and wherein the liquid is positively prevented from dripping out of the discharge opening after a dispensing operation.

It is well known that certain types of liquids are packaged for sale in containers of certain standard and uniform sizes which are rarely varied. That is, many liquids are usually available in quantities of half pints, pints, quarts, gallons, etc. Accordingly, if a particular quantity of a given liquid is desired, it is often necessary to purchase more than the desired amount in order to have enough. Liquid dispensers for use at the retail level have been developed and are frequently used to overcome this problem. However, certain types of liquids have characteristics which make them very difficult to dispense by existing equipment. For example, previous attempts to dispense paints and colorants in small, accurate amounts have been generally unsuccessful.

The dispenser of the invention will be described in terms of its use with paints and colorants, because they are particularly suited to illustrate the problems which the invention can overcome. However, it will be understood that the use of said dispenser is not intended to be restricted by this specific reference.

It often occurs that a small amount, such as a few ounces, of paint is required where a pint or a quart is the smallest quantity which can be purchased. This is frequently true where special colors are desired and must be produced by mixing colorants with a vase paint. More specifically, the colorants are usually packaged in selected amounts proportional to selected quantities of paint, such as quarts and gallons. It is very difficult, at best, to obtain matching colors where less than the complete package of colorant is used.

As a result of this inflexibility in the present means for dispensing paint and colorant, particularly on the retail level, paint and colorants are often wasted, the merchant is required to carry large inventories of paint in many different sizes in order to accommodate various quantity requirements and, accordingly, certain types of paints will deteriorate before they can be sold, thereby producing a serious loss to the merchant. It has become apparent that the above-mentioned problems could be materially reduced, if not eliminated, by providing an apparatus which is capable of dispensing paints and/or colorants in preselected, accurate amounts. This would insure a continuous supply of fresh paints in any amount and thereby reduce the inventory requirements of the merchant.

In providing such an apparatus, it is necessary to cope with the high viscosity of the paint, its tendency to coat and adhere to the surfaces which it touches, and its tendency to harden if exposed to the atmosphere for more than a very short period of time. Moreover, it is important to recognize that paints and colorants contain ingredients which will settle out if the mixture is not under substantially constant agitation.

Accordingly, a primary object of this invention has been the provision of an apparatus which is particularly adapted for dispensing highly viscous liquids in accurate amounts, especially where said liquids are mixtures of ingredients which tend to settle out unless continuously agitated.

A further object of this invention has been the provision of a dispensing apparatus, as aforesaid, which is equipped with valve mechanism for positively preventing the dripping or leaking of the liquid from the discharge opening of the apparatus after a dispensing operation, and which is capable of being totally enclosed and sealed from the atmosphere substantially continuously.

A further object of this invention has been the provision of a dispensing apparatus, as aforesaid, which is pleasing in appearance, which is sturdy in construction, and which utilizes a minimum of moving parts, particularly within the liquid containing chambers, in order to minimize maintenance and cleaning problems.

A further object of this invention has been the provision of a dispensing apparatus, as aforesaid, whereby the amount of liquid dispensed can be accurately preselected and easily changed by making extremely simple adjustments.

Other objects and purposes of this invention will become apparent to persons familiar with this type of equipment upon reading the following specification and examining the accompanying drawings, in which:

FIGURE 1 is a perspective view of a dispensing apparatus embodying the invention.

FIGURE 2 is a broken, front elevational view of said dispensing apparatus.

FIGURE 3 is a sectional view of said dispensing apparatus taken along the line III—III in FIGURE 2.

FIGURE 4 is a sectional view taken along the line IV—IV in FIGURE 3.

FIGURE 5 is a fragment of the opposite side of said dispensing apparatus from that appearing in FIGURE 1.

FIGURE 6 is a sectional view taken along the line VI—VI in FIGURE 3.

FIGURE 7 is a sectional view taken along the line VII—VII in FIGURE 3.

FIGURE 8 is a sectional view taken along the line VIII—VIII in FIGURE 7.

FIGURE 9 is a fragmentary, front elevational view of a modified construction for said dispensing apparatus.

FIGURE 10 is a fragmentary, side elevational view of a modified dispensing apparatus.

FIGURE 11 is a sectional view taken along the line XI—XI in FIGURE 9.

FIGURE 12 is a sectional view taken along the line XII—XII in FIGURE 11.

FIGURE 13 is a sectional view substantially as taken along the line XIII—XIII in FIGURE 10.

FIGURE 14 is a sectional view taken along the line XIV—XIV in FIGURE 11.

For convenience in description, the terms "upper," "lower" and derivatives thereof will have reference to the dispensing apparatus and parts thereof as appearing in FIGURES 2 and 3. The terms "front," "rear" and derivatives thereof will have reference to the right and left ends, respectively, of the dispensing apparatus as appearing in FIGURE 3. The terms "inner," "outer" and derivatives thereof will have reference to the geometric center of said dispensing apparatus and parts thereof.

*General Description*

The objects and purposes of the invention, including those set forth above, have been met by providing a dispensing apparatus comprised of a housing defining a liquid chamber having a discharge compartment near its front end which contains a discharge vane adjacent to a discharge passageway. A supply hopper is supported upon the upper, rearward end of said housing and communicates with the liquid chamber therein. An agitation device is disposed partially within the liquid chamber and partially within the hopper.

The vane is mounted upon a hub having a valving device for controlling the movement of liquid from the discharge compartment into the discharge passageway in response to movement of the vane. The dispensing vane is connected to a manually engageable lever arranged to move said vane a selected and adjustable amount. An alternate or additional valve mechanism may be provided in association with the discharge passageway and is operated in response to the movement of the vane.

Detailed Construction

The dispensing apparatus 10 (FIGURE 1), which has been selected to disclose a preferred embodiment of the invention, is comprised of a dispenser housing 11, which is substantially L-shaped, has a pair of substantially parallel side walls 13 (FIGURE 1) and 14 (FIGURE 3). The housing 11 contains a downwardly and frontwardly sloping, loading chamber 17 which is defined by said side walls, the upper wall 18 and the lower wall 19. The upper wall 18 of the housing 11 has a flanged opening 22 at its rearward end which communicates with the rearward end of the loading chamber 17. The front end of the lower wall 19 has an opening 21 communicating with a dispensing compartment 23 which is disposed between said side walls 13 and 14, the front wall 24 and a downward extension 26 of the lower wall 19, which extension connects with the lower edge of the front wall 24. In this particular embodiment, upper wall 18, lower wall 19, front wall 24 and extension 26 are integral with, and preferably extend a substantially uniform distance from, the side wall 14. The side wall 13, which preferably has substantially the same shape as the side wall 14, is secured by means, such as the bolts 27 (FIGURE 1), to the upper wall 18, lower wall 19, front wall 24 and extension 26.

The side walls 13 and 14 have integral, outwardly extending bosses 28 and 29, respectively, which have coaxial shaft openings 32 and 33 in which the vane shaft 34 is snugly and rotatably disposed. The extension 26 of the lower wall 19 is provided with an angular cavity 35 and an arcuate cavity 36. The arcuate cavity 36 is spaced midway between the lower end of the front wall 24 and the upper side 38 of the angular cavity 35. The arcuate cavity 36 defines a portion of a cylinder concentric with, and spaced from, the vane shaft 34. The lower part 37 of the inner surface of the front wall 24 and the upper side 38 of the cavity 35 define separated portions of a cylinder concentric with said vane shaft 34 and spaced a substantial distance therefrom. The curved surfaces 37 and 38 are separated by the opening 21 between the chamber 17 and the compartment 23. The extension wall 26 has a pair of preferably flat inner surfaces 42 and 43 on the upper and lower sides, respectively, of the arcuate cavity 36, which surfaces preferably extend radially from the axis of the vane shaft 34 to the curved surfaces 38 and 37, respectively.

A dispensing vane 45 has a hub 46 which is concentrically and rigidly secured upon said vane shaft 34 so that the peripheral surface of said hub is snugly and rotatably disposed within the cavity 36. The vane 45 has a blade 47 with substantially flat front and rear surfaces 48 and 49, respectively, which preferably extend substantially radially from the axis of the vane shaft 34. Said surfaces 48 and 49 are disposed approximately at right angles to each other and are engageable with the flat surfaces 42 and 43, respectively. The radially outer surface 52 of the blade 47 defines a portion of the cylinder including the curved surfaces 37 and 38. Accordingly, the outer surface 52 is snugly but slidably engageable with the curved surfaces 37 and 38.

The axial surfaces 53 and 54 (FIGURE 7) of the vane 45 are parallel with and snugly but slidably engageable with the inner surfaces of the side walls 13 and 14, respectively. Accordingly, when the outer surface 52 of the vane 45 is in engagement with the curved surface 37, the front surface 48 of the blade 47, the curved surface 37, the lower flat surface 43 and the adjacent peripheral surface of the hub 46 combine with the side walls 13 and 14 to define a substantially liquid tight zone 51 in front of and/or below the vane 45. Likewise, when the surface 52 of the vane 45 engages the curved surface 38, the rear surface 49 of the blade 47, the curved surface 38, the upper flat surface 42 and the hub 46 combine with the side walls 13 and 14 to define a substantially liquid tight zone 55 behind the vane 45.

The extension wall 26 (FIGURES 3 and 6) has a groove 56 in its free edge which combines with the adjacent surface of the removable side wall 13 to define a discharge passageway which communicates with the arcuate cavity 36 and extends through the bottom wall 57 of the dispensing compartment 23.

The hub 46 (FIGURES 3 and 7) has a circumferentially disposed discharge recess 58 which is adjacent to one axial end of the hub 42 and extends away from the front surface 48 on the blade 47. Said recess 58 is of sufficient circumferential length that it communicates with the upper end of the discharge passageway 56 whenever, but only when, the blade 47 is in engagement with the inner surface 37 of the front wall 24.

A transfer recess 59 (FIGURE 7) is provided in the circumferential surface of the hub 46 and is spaced axially from the discharge recess 58. Said transfer recess 59 extends circumferentially around said hub from the rear surface 49 of the blade 47 to a point where it communicates with the zone 51 in front of the blade 47 whenever the outer surface 52 thereof is in engagement with the curved surface 38 on the extension 26. Thus, the liquid which is trapped within the zone 55 is forcibly expelled therefrom by the vane 45 through the recess 59 toward the lower end of the zone 51 in the compartment 23.

An elongated, manually engageable lever 62 (FIGURES 2 and 5) is secured to, and is rotatable with, the shaft 34 at a point spaced from the housing 11. A bolt 63 is threadedly received into the outer end of the shaft 34 and through the inner end of the lever 62. A stop arm 64 is rotatably supported upon the bolt between the shaft 34 and the bolt head 65. The lower portion 66 of the said arm 64, is flexible axially of said vane shaft 34. The upper portion 67 of said stop arm 64 is offset toward the housing 11 so that it extends into the rotational path of the lever 62. A bolt 68 is threadedly received through a suitable opening in the lever 62 so that its head is engageable with the upper portion 67 of the stop arm 64 for adjusting the minimum distance between the lever 62 and the arm 64.

A curved adjustment plate 69 is secured to the housing 11 by means, such as screws 70, so that said plate 69 extends along the outer surface of, but is preferably spaced outwardly from, the upper wall 18 and the front wall 24. The edge 73 of the adjustment plate 69 projects beyond the surface of the side wall 14 and is provided with a plurality of notches 74 which are carefully located at selected positions along said edge 73. The upper portion of the stop arm 64 has an inwardly extending flange 75 which is slidably and snugly receivable into any one of said notches 74 when the stop arm 64 is in a substantially unflexed position. The arm 64 is removed from a notch by bending the lower portion 66 thereof so that said upper portion 67 moves away from the adjustment plate 69. With the stop arm 64 in one of the notches 74, the bolt 68 on the lever 62 will engage the stop arm 64 after a predetermined amount of rotational movement of the vane shaft 34, hence when a selected amount of liquid has been discharged from the dispenser 10.

The supply hopper 12 (FIGURE 1), which may be of any size or shape, is substantially rectangular and has a bottom wall 96 (FIGURE 3) which is supported upon the flange 97 extending around the opening 22 in the upper wall 18 of the housing 11. Said bottom wall 96 has an outlet opening 98 which is in registry with the opening 22 in the wall 18. The hopper 12 has a removable cover 99.

An agitator 102 (FIGURES 3 and 4) is disposed within the hopper 12 and extends through the flanged inlet opening into the rear end of the loading chamber 17. Said agitator 102 comprises a crankshaft 103 (FIGURE 2) which is received through coaxial openings 104 and 105 in the side walls 100 and 101 of the hopper 12. The portions of the shaft 103 extending through the openings 104 and 105 are rotatably supported within the bearings 113 and 114, respectively. The portion of the shaft 103 within the hopper 12 has a crank 116 which is encircled by a bearing ring 117 to which the upper end of an agitation rod 118 is secured. The lower end of the rod 118 (FIGURE 3) is secured to the agitation plate 119, which is located adjacent to, but is spaced upwardly from, the bottom wall 96 of the hopper 12. A resilient member, such as the spiral spring 121, is connected and held under tension between the plate 119 and the stud 122 on the lower wall 19 of housing 11, directly below the opening 22. The plate 119 is preferably larger than the area of the opening 22 and it has a plurality of closely spaced perforations 123 which reduce the resistance of the plate 119 to movement through the liquid while promoting the agitation of the liquid. Means, such as a motor 124 (FIGURE 2), is connected to one end of the agitator shaft 103 for effecting rotation thereof.

*Operation*

With the dispenser 10 assembled as appearing in FIGURE 1, the cover 99 is removed from the hopper 12, which is filled with a supply of liquid, such as paint. The motor 124 is energized, whereby the agitator 102 is caused to reciprocate vertically within the hopper 12. The lever 62 (FIGURES 1 and 2) will normally be in a substantially upright position when liquid is not being dispensed from the dispenser 10. Under such circumstances, the vane 45 will be in its broken line position of FIGURE 3, so that the liquid can flow by gravity from the loading chamber 17 into the zone 51 of the dispensing compartment 23. The passageway 56 (FIGURE 3) will be blocked by the hub 46 from communication with the discharge recess 58 so that liquid will be unable to escape from the compartment 23.

When it becomes desirable to dispense a particular amount of liquid from the dispenser 10, the stop arm 64 (FIGURE 5) is flexed away from the adjustment plate 69 and rotated around the vane shaft 34 until it is opposite the notch 74 in the plate 69 which, according to appropriate designations upon the adjustment plate 69, corresponds to the desired amount of liquid. The arm 64 is then released so that it will move into such notch. A container of any suitable kind is then placed under the lower end of the discharge passageway 56, after which the lever 62 is manually engaged and moved forwardly until the bolt head 65 engages the arm 64. The bolt 68 will normally be adjusted with respect to the lever 62 before the operation of the dispenser 10 is commenced. However, further adjustment may be made as needed.

As the lever 62 moves away from its upright position of FIGURE 5, it causes the main shaft 34, hence the vane 45 (FIGURE 6), to rotate in a clockwise direction. The vane 45 and the discharge recess 58 in the hub 46 are arranged so that the recess 58 will communicate with the upper end of the discharge passageway 56 not later than the instant when the vane 45 engages said curved surface 37. Accordingly, as soon as the vane 45 moves downwardly from the solid line position of FIGURE 3, liquid within the zone 51 of the discharge compartment 23 will be moved by the vane 45 through the discharge recess 58 and the discharge passageway 56 until the bolt 68 on the lever 62 engages the stop arm 64. At this time, the exact, proper amount of liquid will have been dispensed from the compartment 23 through the passageway 56.

The lever 62 (FIGURE 5) is now rotated in the reverse direction, whereby the vane 45 (FIGURE 3) is moved in a counterclockwise direction. Such movement of the vane 45 develops a low pressure within the zone 51, whereby any liquid within the discharge passageway 56 is drawn upwardly through the passageway 56 and the discharge recess 58 into the zone 51.

After the vane 45 becomes disengaged from the curved surface 37 and before it engages the curved surface 38 on the downward extension 26, the transfer recess 59 (FIGURE 7) in the hub 46 will connect the zone 51 with the zone 55. The size and shape of the recess 58 is such that liquid trapped in the zone 55 will be expelled downwardly and forcibly from the transfer recess 59 into the lower end of the zone 51. At the same time, liquid will move by gravity from the front end of the loading chamber 17 into the zone 51. The liquid expelled from the passageway 59 into the zone 51 will not only agitate itself and the liquid entering the zone 51 through the upper end thereof, but will also dislodge, and drive upwardly, any air bubbles trapped in the lower end of the zone 51 after the previous dispensing operation. Thus, the dispenser 10 will be immediately ready for another dispensing operation.

If a different amount of liquid is desired in the next dispensing operation, the dispenser 10 can be easily and quickly adjusted for such amount by moving the stop arm 64 into the appropriate notch 74 in the adjustment plate 69. The corresponding amount of liquid will then be dispensed from the zone 51 in the dispensing compartment 23 by the vane 45 in response to movement of the lever 62 in a manner substantially as set forth above.

*Alternate Structure*

Under some circumstances, it may be advantageous to provide an additional or alternate valve mechanism, which is operated by the vane but is not a part thereof. The alternate housing 11a (FIGURES 12 and 13) has such a valve 76 in the discharge passageway 77 from the discharge zone 51a. The valve 76 is comprised of a conical valve core 78, which is rotatably disposed within a conical bore 79 extending through the lower end of the housing 11a and intersecting the discharge passageway 77. The axis of the valve bore 79 is preferably parallel with the axis of the vane shaft 34a. The end of the valve core 78 extending through the side wall 14a is threaded for engagement by a nut 80. A resilient washer 82 is sleeved upon the threaded end of the valve core 78 between the nut 80 and the housing 11a for resiliently urging and seating the valve core 78 snugly but rotatably into the valve bore 79, whereby leakage is prevented.

The valve core 78 has a stem 83 of reduced diameter which extends through and beyond the side wall 13a of the housing 11a. A yoke 84 is mounted upon and rotatable with the stem 83 and has a pair of spaced, parallel and radially extending arms 87 and 88 (FIGURE 10). An actuating arm 89 is mounted at one end upon, and is rotatable with, that end of the vane shaft 34a which projects through and beyond the side wall 13a. An actuating pin 92 is secured to the other end of the actuating arm 89 and extends in a direction substantially parallel with the axis of the vane shaft 34a. The pin 92 is arranged so that it is snugly receivable into the slot 93 between the legs 87 and 88 of the yoke 84. The actuating arm 89 and yoke 84 are arranged so that the valve 76 is in its closed position, as appearing in FIGURE 11, when the yoke 84 and arm 89 are substantially vertically aligned, as appearing in FIGURES 9 and 12. Under such circumstances, the vane 45a (FIGURE 11) will be in its solid line position and the lever 62a and stop arm 64a will be in their upright positions. When the vane 45a is moved by the lever 62a into its broken line position of FIGURE 11, the yoke 84 and actuating arm 89 will be about as appearing in FIGURE 10 and the valve 76 will be in its open position as appearing in FIGURE 13.

It will be observed that the zone 51a in the dispensing compartment 23a is slightly larger than the zone 51 in the compartment 23 of FIGURE 3, thereby providing the dispenser 10a with a larger capacity than that of the dispenser 10, even through their outside dimensions may be substantially the same. The alternate housing 11a also includes a zone 55a behind the vane 45a which communicates with the zone 51a by means of the discharge recess 59a (FIGURE 12) in substantially the same manner as set forth above with respect to the corresponding structure of the dispenser 10 appearing in FIGURE 8.

The operation of the alternate dispenser 10a is substantially the same as the operation of the dispenser 10. More specifically, valve 76 is opened just as the vane 45a (FIGURE 11) moves into its broken line position and thereby closes the zone 51a. At this point, the transfer recess 59a is no longer in communication with the zone 52a. Accordingly, fluid trapped in the zone 51a is forced through the discharge passageway 77 for reception into a container (not shown) located below the discharge passageway. As the vane 45a is moved downwardly through the zone 52a from its broken line position in FIGURE 11, the yoke 84 will remain in its FIGURE 10 position while the actuating arm 89 is rotated in a clockwise direction away therefrom. Accordingly, when the actuating arm is rotated in a counterclockwise direction with the return stroke of the vane 45a, the pin 92 will again be received into the slot 93 when the vane 45a reaches the broken line position of FIGURE 11. The continued movement of the vane 45a from its broken line to its solid line position in FIGURE 11 will cause the actuating arm 89 to move the yoke 84 into its FIGURE 9 position wherein the valve 76 will be closed as appearing in FIGURE 11. Moreover, as the vane 45a moves from its broken line position to its solid line position of FIGURE 11, fluid trapped in the zone 55a will be forced through the transfer recess 59a (FIGURE 12) into the lower end of the zone 51a to agitate the liquid and force upwardly any trapped air bubbles therein.

As shown in FIGURES 11 and 14, an alternate agitator 128 may be provided within the rearward end of the loading chamber 17a of the housing 11a so that it agitates the liquid disposed both within the loading chamber 17a and within the supply hopper 12a. The alternate agitator includes a shaft 129 which extends through coaxial openings 131 and 132 in the side walls 13 and 14a, respectively, and which is rotatably supported therein by means of the combined bearing and sealing units 133 and 134, respectively. The shaft 129 is connected to a motor 124a for rotation thereby. A pair of agitation rods are secured to the shaft 129 in any convenient manner so that they will extend into and pass through the lower portion of the supply hopper 12a when the shaft 129 is rotated. Accordingly, the agitator 128 is capable of keeping the liquid in a constant state of agitation.

Although a particular preferred embodiment of the invention has been disclosed in detail above for illustrative purposes, it will be understood that variations or modifications of such disclosure, which lie within the scope of the appended claims, are fully contemplated.

What is claimed is:

1. A dispenser for liquids, comprising: housing means defining a partially cylindrical dispensing compartment having a pair of side walls and a peripheral wall extending between said side walls, part of said peripheral wall being arcuate; means defining an inlet opening through the arcuate peripheral wall and spaced from one circumferential end thereof; a vane pivotally supported within said compartment for movement around an axis concentric with said arcuate peripheral wall and spaced from said one circumferential end thereof, said housing means having an end wall extending transverse to said peripheral wall adjacent said one circumferential end thereof, said vane being snugly engageable with the side and peripheral walls of said compartment for defining with said walls an enclosed zone including said one circumferential end of said arcuate peripheral wall and said end wall; means defining a discharge passageway in said housing communicating with said zone and valve means connected for movement with said vane for opening said passageway when said vane reaches a predetermined position as it travels toward said passageway and for closing said passageway when said vane reaches a predetermined position as it travels away from said passageway.

2. A dispenser for liquids comprising: housing means defining a partially cylindrical dispensing compartment having an arcuate peripheral wall and a pair of side walls; means defining an inlet opening through the arcuate peripheral wall and spaced from the circumferential ends thereof; said housing means having a pair of end walls extending transverse to said arcuate peripheral wall at the respective circumferential ends thereof; a shaft extending through said compartment coaxial with the arcuate peripheral wall thereof; a vane supported upon and movable with said shaft within said compartment, the side and peripheral surfaces of said vane being snugly and slidably engageable with the side and arcuate peripheral walls of said compartment on opposite circumferential sides of said inlet opening for selectively blocking the circumferential ends of said compartment from said inlet opening; means defining an elongated recess in said vane communicating between the opposite circumferential ends of said compartment when said vane is engaging the arcuate peripheral wall near one circumferential end of said compartment; means defining a discharge passageway in said housing communicating with the other circumferential end of said compartment; and valve means mechanically connected to said shaft and responsive to the rotation thereof for opening and closing said passageway when said vane reaches preselected positions within said compartment.

3. The structure of claim 2 including a chamber communicating with said compartment through said inlet opening, and agitating means disposed within said chamber; wherein said valve means is located in said discharge passageway, and linkage connects said valve means to said shaft, whereby said valve is automatically opened as said vane engages said arcuate wall on the side of said inlet opening adjacent said other end of said compartment and said valve is automatically closed as said vane engages said arcuate wall on the other side of said inlet opening.

4. A dispenser for liquids, comprising: housing means defining a partially cylindrical compartment having substantially parallel side walls, a bottom wall and an arcuate wall extending between the opposite ends of said bottom wall, the axis of said arcuate wall being adjacent to said bottom wall and said bottom wall having an arcuate cavity midway between the ends thereof and concentric with said axis; an inlet opening through said arcuate wall and spaced from the circumferential ends thereof; a shaft extending perpendicularly through said side walls and concentric with said axis; a van having a hub supported upon said shaft and rotatable therewith, said hub being snugly and rotatably disposed within said cavity and said vane being snugly embraced by said side walls on opposite circumferential sides of said inlet opening for defining, one at a time, a pair of spaced, liquid tight zones; a discharge passageway communicating with said cavity adjacent to one side wall; a circumferential recess extending partially around said hub, said recess being in communication with one zone and said discharge passageway when, and only when, said vane is in said one zone; and an opening in said hub communicating between said zones when, and only when, said vane is in the other zone.

5. The structure of claim 4 wherein said arcuate wall extends through an arc in excess of approximately 180 degrees, said vane has an arcuate, radially outer surface extending through an arc of approximately 90 degrees, and said arcuate cavity extends through an angle in excess of 90 degrees.

6. The structure of claim 2 including a rotary valve in said discharge passageway and extending through one side wall; a yoke secured to the outer end of said valve and extending radially therefrom, an actuating arm secured to said shaft and extending radially therefrom and actuating means on said arm releasably engageable with said yoke, said arm and said yoke being arranged so that said actuating means engages said yoke and operates said valve as said vane is rotated toward and away from the other circumferential end of said compartment.

7. An apparatus for dispensing a volume of liquid comprising: housing means defining a dispensing compartment having an arcuate peripheral wall and an end wall at one end of said peripheral wall, said end wall extending transverse to said arcuate peripheral wall, said arcuate wall having an inlet opening therethrough; a vane pivotally mounted in sadi compartment and concentric with said arcuate wall, said vane being movable from a position adjacent one end of said inlet opening progressively across said inlet opening and hence across said arcuate wall and being operative to a trap a predetermined volume of liquid in the zone in front of said vane when it engages said arcuate wall adjacent the other end of said inlet opening; means defining a discharge passageway through said end wall; means defining a discharge recess movable with said vane and which is operative to place said zone in communication with said discharge passageway when said vane engages said arcuate wall adjacent the other end of said inlet opening and as said vane moves across arcuate wall toward said end wall; and means for selectively moving said vane.

8. An apparatus according to claim 7 wherein said vane has an enlarged cylindrical hub at one end thereof, which hub is pivotally mounted in a partially cylindrical recess adjacent said end wall, said hub having a groove in the periphery thereof and extending from adjacent said vane to a point spaced circumferentially from said vane, said groove providing said discharge recess.

9. An apparatus for dispensing a selectively variable volume of liquid comprising: housing means defining a dispensing compartment having an arcuate peripheral wall and a pair of end walls extending transverse to said peripheral wall at the respective ends thereof, said housing having a partially cylindrical recess between said end walls, said recess being concentric with said peripheral wall, said peripheral wall having an inlet opening therethrough between the ends thereof; a substantially cylindrical hub disposed in said recess and mounted for pivotal movement therein; said hub having a substantially radially extending vane integral therewith adapted to slidably engage said peripheral wall, said vane being movable from a position adjacent one end wall across said inlet opening and thence across said arcuate wall to a position adjacent the other end wall and being operative to trap a predetermined volume of liquid in the zone in front of said vane when it engages said peripheral wall adjacent one end of said inlet opening as it moves toward said other end wall; means defining a discharge passageway through said other end wall; said hub having a first groove in the periphery thereof extending from adjacent the front side of said vane to a point spaced circumferentially from said vane for placing said zone in communication with said discharge passageway when said vane engages said peripheral wall adjacent said one end of said inlet opening and as said vane moves across said arcuate wall toward said other end wall; said hub having a second groove in the periphery thereof extending from adjacent the rear side of said vane to a point spaced circumferentially from said vane for placing a second zone, formed when said vane engages the arcuate wall adjacent the other end of said inlet opening, in communication with the first-mentioned zone; an operator for selectively moving said vane and an adjustable stop for limiting movement of said vane along said arcuate wall to dispense an amount of liquid determined by the setting of said adjustable stop.

References Cited in the file of this patent

UNITED STATES PATENTS

| | | |
|---|---|---|
| 285,271 | Jackson | Sept. 18, 1883 |
| 842,183 | Doolittle | Jan. 29, 1907 |
| 1,609,292 | Burch | Dec. 7, 1926 |
| 1,859,290 | Davis | May 24, 1932 |
| 2,793,940 | Bennett | May 28, 1957 |